United States Patent
Aihara et al.

(10) Patent No.: US 11,559,788 B2
(45) Date of Patent: Jan. 24, 2023

(54) OXYGEN STORAGE AND RELEASE MATERIAL, CATALYST, EXHAUST GAS PURIFICATION SYSTEM, AND EXHAUST GAS TREATMENT METHOD

(71) Applicants: NIPPON DENKO CO., LTD., Tokyo (JP); JOHNSON MATTHEY PUBLIC LIMITED COMPANY, London (GB)

(72) Inventors: Keigo Aihara, Anan (JP); Tomoharu Itoh, Anan (JP); Hirofumi Konno, Sakura (JP); Shuhei Nagaoka, Sakura (JP); Takashi Yamada, Sakura (JP)

(73) Assignees: NIPPON DENKO CO., LTD., Tokyo (JP); JOHNSON MATTHEY PUBLIC LIMITED COMPANY, London (GB)

( * ) Notice: Subject to any disclaimer, the term of this patent is extended or adjusted under 35 U.S.C. 154(b) by 125 days.

(21) Appl. No.: 16/762,087

(22) PCT Filed: Nov. 6, 2018

(86) PCT No.: PCT/JP2018/041238
§ 371 (c)(1),
(2) Date: May 6, 2020

(87) PCT Pub. No.: WO2019/088302
PCT Pub. Date: May 9, 2019

(65) Prior Publication Data
US 2021/0355851 A1    Nov. 18, 2021

(30) Foreign Application Priority Data
Nov. 6, 2017 (JP) ............................. JP2017-214248

(51) Int. Cl.
*B01J 21/04* (2006.01)
*B01J 21/06* (2006.01)
(Continued)

(52) U.S. Cl.
CPC .............. *B01J 23/44* (2013.01); *B01J 21/066* (2013.01); *B01J 23/10* (2013.01); *B01J 23/40* (2013.01);
(Continued)

(58) Field of Classification Search
CPC . B01J 21/04; B01J 21/06; B01J 21/063; B01J 21/066; B01J 21/08; B01J 21/10;
(Continued)

(56) References Cited

U.S. PATENT DOCUMENTS 6,412,898 B1 * 7/2002 Danzuka ................ B41J 2/2056
                                                        347/15
6,660,683 B1 * 12/2003 Yaluris ................... C10G 11/04
                                                        502/241
(Continued)

FOREIGN PATENT DOCUMENTS

CN    103987663 A    8/2014
JP    2004-529837 A  9/2004
(Continued)

OTHER PUBLICATIONS

Ozawa et al., "Influence of Ceria Doping on Oxygen Relaxation and Oxide Ion Conduction in Yttria Stabilized Cubic Zirconia", Materials, vol. 60, No. 3, Mar. 2011, 1st page Abstract, pp. 194-197.

*Primary Examiner* — Cam N. Nguyen
(74) *Attorney, Agent, or Firm* — Birch, Stewart, Kolasch & Birch, LLP (57) ABSTRACT

The problem to be solved by the present invention is to provide an oxygen storage and release material comprising a ceria-zirconia-based complex oxide improved in ability to remove HC and NOx and a three-way catalyst able to reduce an amount of NOx emission. Further, to solve this problem, an oxygen storage and release material comprising a ceria-zirconia-based complex oxide containing $Gd_2O_3$ in 0.1 mol
(Continued)

% or more and less than 20 mol % and having an ion conductivity of $2\times10^{-5}$ S/cm or more at 400° C. is provided. Further, in addition to the above, an oxygen storage and release material having a molar ratio of cerium and zirconium of 0.2 or more and 0.6 or less by cerium/(cerium+ zirconium) and a speed of oxygen storage and release "$\Delta t_{50}$" of 20.0 seconds or more or amount of oxygen storage and release of 300 μmol-$O_2$/g or more etc. was obtained. Further, by applying the oxygen storage and release material to the catalyst, it is possible to assist the purification of exhaust gas as it changes every instant in accordance with the driving conditions and possible to obtain a catalyst with a higher ability to remove harmful components of catalytic precious metals than before. In particular, it is possible to obtain an automotive exhaust gas purification system excellent in ability to remove CO, NOx, and HC.

16 Claims, 6 Drawing Sheets (51) Int. Cl.

| | | |
|---|---|---|
| *B01J 21/08* | (2006.01) | |
| *B01J 21/10* | (2006.01) | |
| *B01J 21/12* | (2006.01) | |
| *B01J 21/14* | (2006.01) | |
| *B01J 23/10* | (2006.01) | |
| *B01J 23/40* | (2006.01) | |
| *B01J 23/42* | (2006.01) | |
| *B01J 23/44* | (2006.01) | |
| *B01J 23/46* | (2006.01) | |
| *B01J 23/63* | (2006.01) | |
| *B01J 35/00* | (2006.01) | |
| *B01J 35/04* | (2006.01) | |
| *F01N 3/10* | (2006.01) | |
| *F01N 3/08* | (2006.01) | |

(52) U.S. Cl.
CPC ............ *B01J 23/63* (2013.01); *B01J 35/002* (2013.01); *B01J 35/04* (2013.01); *F01N 3/101* (2013.01); *F01N 3/0835* (2013.01); *F01N 3/0842* (2013.01); *F01N 3/0857* (2013.01)

(58) Field of Classification Search
CPC ... B01J 21/12; B01J 21/14; B01J 23/10; B01J 23/40; B01J 23/42; B01J 23/44; B01J 23/46; B01J 23/464; B01J 23/63; B01J 35/002; B01J 35/04; F01N 3/101
USPC ........ 502/258–262, 302–304, 332–334, 339, 502/349–351, 355, 415, 439, 527.19
See application file for complete search history.

(56) References Cited

U.S. PATENT DOCUMENTS

| | | | | |
|---|---|---|---|---|
| 6,680,036 | B1* | 1/2004 | Fisher | B01D 53/945 |
| | | | | 423/213.2 |
| 6,797,668 | B2* | 9/2004 | Yoshikawa | B01J 23/63 |
| | | | | 502/304 |
| 6,893,998 | B2* | 5/2005 | Shigapov | B01J 23/63 |
| | | | | 502/327 |
| 7,030,055 | B2* | 4/2006 | Yaluris | B01D 53/8628 |
| | | | | 502/326 |
| 7,754,171 | B2* | 7/2010 | Chen | B01J 23/63 |
| | | | | 423/213.2 |
| 7,879,755 | B2* | 2/2011 | Wassermann | B01D 53/945 |
| | | | | 502/304 |
| 8,038,951 | B2* | 10/2011 | Wassermann | B01J 35/04 |
| | | | | 422/168 |
| 8,853,120 | B2* | 10/2014 | Aoki | B01J 35/0006 |
| | | | | 502/303 |
| 8,993,475 | B2* | 3/2015 | Kimura | B01J 23/002 |
| | | | | 502/304 |
| 10,112,180 | B2* | 10/2018 | Morikawa | C04B 35/62655 |
| 10,201,804 | B2* | 2/2019 | Karpov | B01J 37/16 |
| 10,329,984 | B2* | 6/2019 | Hatanaka | B01J 21/066 |
| 10,987,654 | B2* | 4/2021 | Itoh | B01J 21/066 |
| 2002/0032123 | A1* | 3/2002 | Shigapov | B01D 53/945 |
| | | | | 502/304 |
| 2002/0132732 | A1 | 9/2002 | Brezny et al. | |
| 2010/0040523 | A1 | 2/2010 | Larcher et al. | |
| 2010/0240525 | A1* | 9/2010 | Golden | B01J 23/002 |
| | | | | 502/65 |
| 2012/0264587 | A1 | 10/2012 | Schermanz et al. | |
| 2013/0142713 | A1 | 6/2013 | Ifrah et al. | |
| 2013/0143732 | A1* | 6/2013 | Aoki | B01J 37/04 |
| | | | | 502/304 |
| 2014/0037524 | A1 | 2/2014 | Mikita et al. | |
| 2014/0309104 | A1 | 10/2014 | Murota et al. | |
| 2018/0065110 | A1 | 3/2018 | Kim et al. | |
| 2018/0071679 | A1* | 3/2018 | Karpov | B01J 37/0248 |
| 2018/0252139 | A1* | 9/2018 | Hatanaka | B01J 37/04 |
| 2019/0039049 | A1 | 2/2019 | Itoh et al. | |
| 2019/0105636 | A1* | 4/2019 | Wang | B01J 23/464 |

FOREIGN PATENT DOCUMENTS

| | | |
|---|---|---|
| JP | 2006-256912 A | 9/2006 |
| JP | 2009-537432 A | 10/2009 |
| JP | 2011-121851 A | 6/2011 |
| JP | 2012-519060 A | 8/2012 |
| JP | 2012-180271 A | 9/2012 |
| JP | 2013-525255 A | 6/2013 |
| JP | 2017-42752 A | 3/2017 |
| WO | WO 2012/105454 A1 | 8/2012 |
| WO | WO 2017/130917 A1 | 8/2017 |

* cited by examiner

NMHC: NONMETHANE HYDROCARBON

OXYGEN STORAGE AND RELEASE MATERIAL, CATALYST, EXHAUST GAS PURIFICATION SYSTEM, AND EXHAUST GAS TREATMENT METHOD

FIELD

The present invention relates to an oxygen storage and release material comprising a ceria-zirconia-based complex oxide (composite oxide). In particular, it relates to an oxygen storage and release material with a large speed of oxygen-storage and -release used as a catalytic promoter in an exhaust gas purification catalyst. Furthermore, it relates to a three-way catalyst including the oxygen storage and release material.

BACKGROUND

In the past, a three-way catalyst has been used as a means for removing harmful substances such as carbon monoxide (CO), hydrocarbons (HC), and nitrogen oxides (NOx) from automotive exhaust gas. A three-way catalyst simultaneously oxidizes CO and HC and reduces nitrogen oxides (NOx) to purify the exhaust gas. In those three-way catalysts, a three-way catalyst comprising an porous alumina material having a high surface area or other refractory porous oxide materials loaded with a precious metal (for example, Pt, Rh, Pd, Ir, Ru, etc.), which is coated on such as a refractory ceramic or metal honeycomb carrier, alternatively refractory beads carrier, has generally been used.

In a three-way catalyst used for purifying exhaust gas of a gasoline engine, to enhance the catalytic activity of the precious metal, it is preferable to maintain a constant ratio of air and fuel (A/F ratio), that is, a stoichiometric A/F ratio. However, the air-fuel ratio greatly changes in accordance with the operating situation such as acceleration, deceleration, low speed driving, and high speed driving. For this reason, feedback control using an oxygen sensor has been used to try to maintain a constant of the A/F ratio, although the A/F ratio fluctuates depending on the operating conditions of the engine. Even for the feedback control using an oxygen sensor, changes in the A/F ratio occur according to the feedback time. Thus, it is difficult to hold the exhaust gas atmosphere at the stoichiometric A/F ratio and/or neighborhood thereof it by just control of the engine.

For this reason, it is necessary for the catalyst itself to finely adjust the atmosphere more. Ceria (cerium oxide $CeO_2$) has an oxygen storage/release capacity (below, sometimes simply referred to as "OSC" being short for oxygen storage capacity that is the same meaning as oxygen storage/release capacity), and therefore, the ceria is generally used as a catalytic promoter for adjusting the oxygen partial pressure around catalyst for purification of the automotive exhaust gas. This utilizes a redox reaction of $Ce^{3+}/Ce^{4+}$. The ceria is generally used in solid solution with zirconia (zirconium oxide $ZrO_2$) as a ceria-zirconia-based complex oxide for improving this property.

The ceria-zirconia-based complex oxide loaded with catalytic precious metals is generally mixed with alumina in a ratio of several percent to several tens of percent, and then is wash-coated on the surface of a honeycomb carrier in a wash-coat layer of a thickness of several tens of μm to several hundreds of μm. Thus, the ceria-zirconia-based complex oxide gives functions as a catalytic promoter.

The catalyst wash-coated at the inside of the honeycomb carrier purifies the exhaust gas running therethrough by way contact therewith. However, the overall length of the honeycomb carrier is a short 10 cm to at most 30 cm or so. The time for purifying the exhaust gas is extremely short. To complete the purification in this short time, the adjustment of the oxygen partial pressure by way of the ceria-zirconia-based complex oxide also has to be completed in a very short time of the millisecond units. In that past, ceria-zirconia-based complex oxide has been developed focusing on maintaining the specific surface area after the heating endurance (aging) test in order to increase the contact area with the exhaust gas (see PTL 1).

As prior arts as to development focusing on the oxygen storage and release speed of the ceria-zirconia-based complex oxide, for example, there are PTL 2 to PTL 4. PTL 2 focuses on the speed of oxygen-storage and -release until 60 seconds after start of reduction. PTL 3 proposes a ceria-zirconia-based complex oxide with a large amount of OSC and improving a speed of oxygen-release obtained by way of combining a composite of a ceria-zirconia-based complex oxide having a pyrochlore structure and a ceria-zirconia complex oxide having a fluorescent structure.

Further, PTL 4 proposes a metal acetyl acetonate-treated ceria-zirconia-based hydrated oxide consisting of a ceria-zirconia-based hydrated oxide treated on the surface thereof with an acetyl acetonate of at least one element selected from the group consisting of La, Pr, Nd, Sm, Gd, and Y for the purpose of increasing the specific surface area of the ceria-zirconia-based complex oxide etc.

Further, PTL 5 discloses suppressing the formation of coke in a cracking reaction of naphtha by virtue of including Gd at the surface of a solid acid catalyst (silica-alumina catalyst, that is, zeolite catalyst) other than ceria-zirconia.

On the other hand, as an example of measuring the ion conductivity of a ceria-zirconia-based complex oxide, for example, there is NPL 1.

CITATIONS LIST

[Patent Literature]
[PTL 1] Japanese Unexamined Patent Publication No. 2012-180271
[PTL 2] Japanese Unexamined Patent Publication No. 2011-121851
[PTL 3] International Publication No. 2012/105454
[PTL 4] Japanese Unexamined Patent Publication No. 2006-256912
[PTL 5] U52018/0065110 A1
[Nonpatent Literature]
[NPL 1] "Materials", Vol. 60, No. 3, pp. 194-197 (Influence of Ceria Doping on Oxygen Relaxation and Oxide Ion Conduction in Yttria Stabilized Cubic Zirconia), March 2011

SUMMARY

Technical Problem

In the above way, a ceria-zirconia-based complex oxide used as an oxygen storage and release material has been known. Up until now, in an automotive exhaust gas purification catalyst etc., a large amount of OSC or large specific surface area for maintaining a large amount of OSC has been demanded. Development responding directly at this demand has been underway. Furthermore, electronic control of engines has become to be widely used. Electronic control of fuel injection for improving the fuel efficiency and improving the engine performance has also become increasingly complicated. In the midst of this situation, the demands on ceria-zirconia-based complex oxides have also been changing. Specifically, a ceria-zirconia-based complex oxide having a function of OSC able to match the complicated electronic control has been demanded.

Development efforts of a ceria-zirconia-based complex oxide for use for an oxygen storage and release material up to now have, in PTL 1, only studied the additive elements for obtaining a large amount of OSC and excellent durability. Up until now, demand for speed of oxygen-storage and release has not surfaced, so almost no attempts have been made to improve the speed of oxygen-storage and release of ceria-zirconia-based complex oxides. Even the method of evaluation has not been clear.

PTL 2 describes it is possible to improve the response speed of OSC by including a specific amount of indium oxide in a ceria-zirconia-based complex oxide. In PTL 2, hydrogen ($H_2$) is used as a reducing agent in measurement of the response speed of OSC, but under actual exhaust gas conditions, this is reduced by the carbon monoxide (CO), so it is not possible to sufficiently evaluate the required properties. Further, the ceria-zirconia-based complex oxide unloaded with catalytic precious metals is evaluated as it is, but in actuality, it is used while loading it with catalytic precious metals, so it should be evaluated whether the response speed of OSC is improved by the property while loading it with catalytic precious metals. In this regard, however, this point is not evaluated in any way. In preliminary studies of the inventors, it was learned that when loading it with catalytic precious metals, the response speed of OSC cannot necessarily be improved under conditions of reduction of carbon monoxide with just the content of indium oxide. Further, in a ceria-zirconia-based complex oxide which an OSC material consists of, the indium oxide is a particular and expensive additive, and therefore, a method improving the response speed of OSC without using indium oxide has been desired.

PTL 3 considers that a pyrochlore structure ceria-zirconia-based complex oxide can store and release a large amount of oxygen. On the other hand, it considers that a cubic crystal (phosphor structure) ceria-zirconia-based complex oxide has larger speed of oxygen-storage and -release. Further, it considers that a ceria-zirconia-based complex oxide combining these exhibits an excellent catalyst performance. The standard for evaluation of the speed of OSC is the duration time of stoichiometry of the atmosphere after changing from a lean to rich ratio. However, this does not measure the speed of OSC right after change of the atmosphere covered by the present invention. The properties have not been sufficiently evaluated.

PTL 4 has as its object increasing the specific surface area of a ceria-zirconia-based complex oxide etc. and discloses modifying the surface of the ceria-zirconia-based hydrated oxide by an acetyl acetonate of at least one element selected from the group consisting of La, Pr, Nd, Sm, Gd, and Y. However, it does not focus on Gd, and it does not disclose at all that the purification ability is remarkably specifically improved by way of adding a predetermined amount of $Gd_2O_3$ to a ceria-zirconia-based complex oxide with a high ion conductivity.

PTL 5 discloses a catalyst containing Gd on the surface thereof, but the support of the catalyst is a solid acid catalyst zeolite. This does not describe or suggest using a ceria-zirconia-based complex oxide which stores or releases oxygen as a support. Further, the catalyst is utilized for a chemical synthesis reaction. There is no description or suggestion of use as a catalyst for exhaust gas purification of an automobile etc.

NPL 1 measures an internal frictional strength of a ceria-zirconia-based complex oxide and discloses the relationship with the ion conductivity. However, NPL 1 does not link this relationship with the speed of oxygen-storage and -release as an OSC material.

The inventors found that a ceria-zirconia-based complex oxide with a large amount of oxygen-storage and -release or speed of OSC is not necessarily high in ability to purify HC or NOx. Therefore, in recent engine control, conventional ceria-zirconia-based complex oxide with a large amount of oxygen-storage and -release or speed of OSC is not adequate for purifying HC or NOx. Rather, regardless of whether the amount of oxygen-storage and -release or speed of OSC is large or not, a ceria-zirconia-based complex oxide with a large ability to remove HC or NOx is sought at present.

The present invention was made in consideration of the above situation and the technical problem to be solved by the present invention is to provide an oxygen storage and release material comprising a ceria-zirconia-based complex oxide improved in ability in purifying hydrocarbons (HC) and nitrogen oxides (NOx) and a three-way catalyst containing the same.

Solution to Problem

The inventors engaged in intensive studies to solve the above problem and as a result found that when adding a predetermined amount of $Gd_2O_3$ to a ceria-zirconia-based complex oxide with a large ion-conductivity, a ceria-zirconia-based complex oxide with a remarkably improved ability to specifically remove HC and NOx is obtained and thereby completed the present invention.

Further, the inventors found that when a three-way catalyst is a catalyst including a ceria-zirconia-based complex oxide containing a predetermined amount of Gd, the three-way catalyst reduces the amount of emission of NOx in a running mode test.

That is, the gist of the present invention is as follows:
(1) An oxygen storage and release material comprising a ceria-zirconia-based complex oxide containing $Gd_2O_3$ in 0.1 mol % or more and less than 20 mol % and having an ion conductivity of $2 \times 10^{-5}$ S/cm or more at 400° C.
(2) The oxygen storage and release material according to the above (1) wherein a molar ratio of cerium and zirconium in the ceria-zirconia-based complex oxide is 0.2 or more and 0.6 or less by cerium/(cerium+zirconium).
(3) The oxygen storage and release material according to the above (1) or (2) wherein the ceria-zirconia-based complex oxide includes at least one of an alkali earth and rare earth ions having an ion radius larger than $Gd^{3+}$ ions.
(4) The oxygen storage and release material according to any one of the above (1) to (3) wherein a speed of oxygen-storage and -release (speed of OSC) $\Delta t_{50}$ is 20.0 seconds or more.
(5) The oxygen storage and release material according to any one of the above (1) to (4) wherein an amount of oxygen-storage-release (amount of OSC) is 300 $\mu$mol-$O_2$/g or more.
(6) A catalyst including an oxygen storage and release material wherein the catalyst includes the oxygen storage and release material according to any one of the above (1) to (5).
(7) A catalyst according to the above (6) wherein the catalyst has a honeycomb structure of a ceramic honeycomb or metal honeycomb coated with a catalyst layer.
(8) The catalyst according to the above (6) including an oxygen storage and release material wherein the catalyst includes at least one compound selected from cerium oxide, zirconium oxide, and a ceria-zirconia-based complex oxide.
(9) A catalyst according to any one of the above (6) to (8) wherein the catalyst includes an oxygen storage and release material of a ceria-zirconia-based complex oxide.
(10) The catalyst according to the above (9) wherein the catalyst includes an oxygen storage and release material of a ceria-zirconia-based complex oxide with a molar ratio of zirconia:ceria of 20:1 to 1:20.
(11) A catalyst according to any one of the above (6) to (10) wherein the catalyst includes a precious metal of the platinum group.
(12) The catalyst according to the above (11) wherein the catalyst includes at least one precious metal selected from among platinum, palladium, and rhodium.
(13) The catalyst according to any one of the above (6) to (12) wherein the catalyst further includes an inorganic oxide.
(14) The catalyst according to the above (13) wherein the inorganic oxide is at least one compound selected from alumina, lanthanum-stabilized alumina, alkali earth-stabilized alumina, silica, aluminosilicates, magnesia/alumina complex oxide, titania, niobium oxide, tantalum oxide, neodymium oxide, yttrium oxide, and lanthanoids.
(15) The catalyst according to the above (6) to (14) wherein the oxygen storage and release material contains Nd of an amount of 0.1 to 20 mol %.
(16) An exhaust gas purification system for treating combustion exhaust gas including the catalyst according to any of the above (6) to (15).
(17) A method of treating exhaust gas from an internal combustion engine bringing the catalyst according to any one of the above (6) to (15) into contact with exhaust gas.

Advantageous Effects of Invention

In the above way, by virtue of using an oxygen storage and release material comprising a ceria-zirconia-based complex oxide including Gd according to the present invention for an automotive exhaust gas purification catalyst, it is possible to aid purification of exhaust gas which changes from moment to moment in accordance with the driving state and realize a higher performance of precious metals in removing harmful components more than in the past. According to the present invention, it is possible to obtain an automotive exhaust gas purification catalyst excellent in particular in ability to remove NOx.

BRIEF DESCRIPTION OF DRAWINGS

FIGS. 6A and 6B are views showing the results of an FTP mode running test, wherein
FIG. 6A is a view showing the results of evaluation of CO while

DESCRIPTION OF EMBODIMENTS

A material comprising a ceria-zirconia-based complex oxide having a large ion-conductivity according to the present invention can be made larger in HC or NOx decomposition activity by addition of Gd. Further, when the material according to the present invention being used for an automotive exhaust gas purification catalyst, the material can aid purification of exhaust gas which changes from moment to moment in accordance with the driving conditions.

When the ion conductivity is low, movement of oxygen inside the ceria-zirconia-based complex oxide becomes harder. Therefore, the effect of added Gd becomes hard to appear and the performance in removing harmful components is reduced.

The ceria-zirconia-based complex oxide according to the present invention is a ceria-zirconia-based complex oxide comprising a ceria-zirconia-based complex oxide which contains $Gd_2O_3$ in 0.1 mol % or more and less than 20 mol %, and which has an ion conductivity of $2\times10^{-5}$ S/cm or more at 400° C.

By including $Gd_2O_3$ in 0.1 mol % or more and less than 20 mol %, the performance in purification becomes specifically remarkably improved. If $Gd_2O_3$ is less than 0.1 mol %, the effect is not obtained, while if over 20 mol %, the effect falls. Therefore, the amount of less than 20 mol % was made the upper limit.

Further, a ceria-zirconia-based complex oxide wherein metal ions having valances of less than 4 (Ca, Sc, Sr, Y, Ba, La, Pr, Nd, Sm, Yb, etc.) are substituted for part of the cerium or zirconium is preferable.

As substitutional metal-ion elements in which an effect is particularly obtained, Sc, Y, La, Pr, Nd, etc. may be mentioned. As the effect of substituting the elements, for Sc, Y, etc., improvement of the ion conductivity may be mentioned, while for La, Pr, Nd, etc., improvement of the heat resistance may be mentioned. The amount of substitution is not particularly limited, but 20 mol % or less with respect to the total cations of the ceria-zirconia-based complex oxide is preferable. To obtain a greater substitution effect, the amount is 3 mol % or more and 20 mol % or less, more preferably 3 mol % or more and 15 mol % or less.

The material with a fast speed of oxygen-storage and -release (ceria-zirconia-based complex oxide) preferably has an ion conductivity of a sintered body measured by the AC impedance method of $2\times10^{-5}$ S/cm or more at 400° C. The upper limit of the ion conductivity is not particularly limited, but preferably is $1\times10^{-2}$ S/cm or less. If the ion conductivity is high, movement of the oxygen in the particles easily occurs and the purification performance becomes higher. If the ion conductivity is less than $2\times10^{-5}$ S/cm at 400° C., movement of oxygen in the particles becomes harder to occur, so the purification performance is poor. To raise the ion conductivity, a third component (substituted metal-ion with the exception of Ce and Zr ions) is added, but the amount of Ce ions for storing and releasing oxygen decreases by the amount of increase of the third component, so it is difficult to prepare a material with an ion conductivity over $1\times10^{-2}$ S/cm.

As one embodiment, the ceria-zirconia-based complex oxide preferably contains at least one type of ions among alkali earth and rare earth ions having ion radii larger than $Gd^{3+}$ ions. As metal ions having ion radii larger than $Gd^{3+}$ ions, metal ions of La, Pr, and Nd are particularly desirable. By including metal ions having large ion radii, the oxygen polyhedrons become dense and as a result the heat resistance is improved.

Further, as one embodiment, the molar ratio of cerium and zirconium of the ceria-zirconia-based complex oxide is preferably 0.2 or more and 0.6 or less in terms of the ratio expressed by the formula of cerium/(cerium+zirconium) (ratio of number of moles of cerium to total of numbers of moles of cerium and zirconium). More preferably, it is 0.5 or less. If cerium/(cerium+zirconium) is over 0.6, the amount of cerium becomes greater and change in valence of the cerium ion becomes difficult to occur, so improvement of the speed of oxygen-storage and -release is not expected. When the molar ratio of cerium/(cerium+zirconium) is 0.2 or more, the speed of OSC can be improved. However, in order to obtain a greater effect, 0.25 or more is preferable. More preferable is 0.3 or more.

As one embodiment, from the viewpoint of a greater speed of oxygen-storage and -release of the ceria-zirconia-based complex oxide being obtained, cerium/(cerium+zirconium) is preferably 0.5 or less. In this case, the metal (alkali earth and rare earth) ions having ion radii larger than the $Ce^{4+}$ ions, particularly La, Pr, and Nd are preferably included. By including metal ions having large ion radii, the crystal lattice of the complex oxides becomes broader, so the ion radii easily change along with the change in valence from $Ce^{4+}$ to $Ce^{3+}$. As a result, the effect of increasing the speed of OSC is obtained. In order to increase the speed of OSC and improve the catalytic performance of the precious metal in removing harmful components, the speed of OSC "$\Delta t_{50}$" is preferably 20.0 seconds or more. The speed of OSC "$\Delta t_{50}$" is preferably high. The upper limit is not particularly limited, but 30.0 seconds or less is realistic.

Further, as one embodiment, from the viewpoint of a large amount of oxygen storage and release being obtained, the ceria-zirconia-based complex oxide has a cerium/(cerium+zirconium) ratio of 0.2 or more and 0.6 or less, more preferably 0.25 or more and 0.5 or less. In this case, metal ions having ion radii larger than the $Ce^{4+}$ ions, in particular La, Pr, and Nd, are desirable. By including metal ions having large ion radii, the crystal lattice of the complex oxides broadens, so the ion radii easily change along with the change in valence from $Ce^{4+}$ to $Ce^{3+}$. As a result, the effect of increasing the OSC amount of oxygen is obtained. The OSC amount is preferably 300 µmol-$O_2$/g or more. The OSC amount is preferably larger. The upper limit is not particularly limited, but 600 µmol-$O_2$/g is realistic.

Further, as one embodiment, a catalyst including an oxygen storage and release material including Gd is preferably used as a three-way catalyst. The oxygen storage and release material preferably includes at least one compound selected from cerium oxide, zirconium oxide, and a ceria-zirconia-based complex oxide. It more preferably includes a ceria-zirconia-based complex oxide. The ceria-zirconia-based complex oxide may also include La, Nd, Y, Pr, or other dopants (substitutional element).

The ceria-zirconia-based complex oxide is one with a zirconia-ceria molar ratio of at least 50:50 or more, more preferably over 60:40, still more preferably over 75:25. Furthermore, the oxygen storage and release material functions as a support material loading the precious metal component.

On the other hand, the ceria-zirconia-based complex oxide may have a zirconia-ceria molar ratio of 20:1 to 1:20. As a more specific embodiment, the ceria-zirconia-based complex oxide may have a zirconia-ceria molar ratio of 10:1 to 1:10. As a more specific embodiment, the ceria-zirconia-based complex oxide may have a zirconia-ceria molar ratio of 5:1 to 1:1. As another embodiment, the ceria-zirconia-based complex oxide may have a zirconia-ceria molar ratio of 4:1 to 2:3.

The catalyst includes 0.1 to 20 mol % of gadolinium in the oxygen storage and release material. Preferably, it includes 1 to 15 mol %, more preferably 2 to 10 mol % of gadolinium.

When an Gd component is contained in the oxygen storage and release material as an added component (substitutional component), the Gd-added (Gd-substituting) ceria-zirconia-based complex oxide has a crystallite size of less than 50 nm after carrying out an oxidation and reduction durability test of 1000° C. for 20 hours in a water vapor atmosphere using an oxidizing atmosphere gas and reducing atmosphere gas of the compositions shown in Table 1. Further, in the oxidation and reduction durability test, the oxidation and reduction are repeated at 3 minute-intervals. The catalyst is alternately exposed to an oxidizing atmosphere and reducing atmosphere at the intervals. After carrying out the above-mentioned oxidation and reduction durability test at 1000° C. for 20 hours in a water vapor atmosphere, the Gd-added (Gd-substituting) ceria-zirconia-based complex oxide preferably has a crystallite size of less than 40 nm, more preferably less than 30 nm, still more preferably less than 25 nm.

TABLE 1

| | $H_2$ (%) | CO (%) | $O_2$ (%) | $H_2O$ (%) | $N_2$ |
|---|---|---|---|---|---|
| Oxidizing atmosphere gas | 0 | 0 | 3 | 10 | Balance |
| Reducing atmosphere gas | 3 | 3 | 0 | 10 | Balance |

The catalyst includes a metal component of the platinum group of precious metals. The metal component of the platinum group is preferably at least one element selected from palladium, platinum, and rhodium.

The catalyst may further contain an inorganic oxide. The inorganic oxide is preferably an oxide of an element of Group II, Group III, Group IV, Group V, Group XIII, and Group XIV.

The inorganic oxide is more preferably at least one oxide selected from alumina, magnesia, lanthanum oxide, silica, titanium oxide, niobium oxide, tantalum oxide, molybdenum oxide, tungsten oxide, and complex oxides of these oxides. Particularly preferable inorganic oxides are alumina, aluminum oxide/lanthanum oxide complex oxides, and magnesia/alumina complex oxides. Among the inorganic oxides, aluminum oxide/lanthanum oxide complex oxides and magnesia/alumina complex oxides are more preferable. The inorganic oxide may also be used as a support loading a precious metal.

The inorganic oxide preferably has an initial (fresh) specific surface area exceeding 80 m²/g and a pore volume of a range of 0.1 to 4 mL/g. An inorganic oxide of a high specific surface area having a specific surface area over 100 m²/g is particularly preferred. For example, it is a high specific surface area alumina. As another preferable inorganic oxide, there is a lanthanum oxide/aluminum oxide complex oxide. The complex oxide may further contain a component including cerium, for example, ceria. In this case, ceria may be present on the surface of the lanthanum oxide/aluminum oxide complex oxide, for example, may be coated on it.

The ratio of the oxygen storage and release material to the inorganic oxide is less than 10:1 by mass ratio, preferably less than 8:1 or less than 5:1, more preferably less than 4:1 or less than 3:1, most preferably less than 2:1, which is calculated by way of mass of oxygen storage and release material:mass of inorganic oxide.

In another embodiment, the ratio of the oxygen storage and release material to the inorganic oxide is 10:1 to 1:10 by mass ratio of the oxygen storage and release material: inorganic oxide, preferably 8:1 to 1:8 or 5:1 to 1:5, more preferably 4:1 to 1:4 or 3:1 to 1:3, most preferably 2:1 to 1:2.

The catalyst of the present invention may also be coated on a carrier to form a catalyst structure. The catalyst structure may also contain further components or constituents known to persons skilled in the art. For example, as the components or constituents, a binder or surfactant may be further included. When a binder is used, a dispersible alumina binder is preferably applied to the catalyst structure.

The carrier may be a flow-through monolith (honeycomb monolith)) or wall flow monolith (particulate filter). The more preferable carrier is a flow-through monolith.

A flow-through monolith carrier has a first surface (front surface) and second surface (back surface) in the vertical direction. The flow-through monolith structure has a plurality of channels (tunnel holes) between the first surface and second surface. The large number of channels run through the vertical direction and have a plurality of inside surfaces (that is, surfaces of walls sectioning off the channels). The plurality of channels open from the first surface to the second surface. To avoid misunderstanding in the explanation, a "flow-through monolith" is not a partition wall permeable filter (wall flow filter). The first surface is typically the inlet side of the carrier, while the second surface is the outlet side of the carrier. The channels have certain widths. The large number of channels have uniform channel widths.

The flow-through monolith has 100 to 900 channels per unit cubic inch inside the surface perpendicular to the length direction (vertical surface), preferably 300 to 750 channels. For example, in the first surface, the densities of the open first channels and closed second channels are 300 to 750 per unit cubic inch. The channels have rectangular, square, circular, elliptical, triangular, hexagonal, and other polyhedral cross-sectional shapes.

The monolith carrier acts as a base material holding the catalyst material. As suitable materials of which the monolith carrier is formed, there are cordierite, silicon carbide, silicon nitride, zirconia, mullite, spodumene, alumina-silica (aluminosilicates), magnesia, zirconium silicates, refractories, porous materials of the same, and other ceramic materials. It is known in the art to use these to produce such a material and porous monolith carrier.

As one embodiment, a flow-through monolith carrier is a single piece (for example, a single block). However, when used as an exhaust gas treatment system, the monolith used may be formed by assembling a large number of channels or may be formed by assembling a large number of small monoliths. As the techniques for these, the techniques of molding and assembly suitable for exhaust gas treatment systems are of course technically known.

In embodiments in which the catalyst includes a ceramic carrier, the ceramic carrier comprises a suitable refractory material, for example, alumina, silica, titania, ceria, zirconia, magnesia, zeolite, silicon nitride, zirconium silicates, magnesium silicates, aluminosilicate, metalloaluminosilicates (cordierite, spodumene, etc.) or mixtures or complex oxides of one or more of the same. Among these as well, cordierite, magnesium aluminosilicate, and silicon carbide are particularly preferred.

As one embodiment, a three-way catalyst containing a Gd-containing ceria-zirconia-based complex oxide can effectively reduce the amounts of emission of HC, CO, and NOx in the modal test for emission control, in particular, can remarkably decrease the amounts of emission of CO and NOx. That is, when the three-way catalyst used for the exhaust gas purification of a gasoline engine includes the ceria-zirconia-based complex oxide, it is possible to effectively reduce the amounts of emission of HC, CO, and NOx, in particular it is possible to remarkably reduce the amounts of emission of CO and NOx. The three-way catalyst of the present invention may also contain the Gd-containing ceria-zirconia-based complex oxide as it is, but the ceria-zirconia-based complex oxide more preferably is loaded with Pd, Rh, Pt, or another precious metal catalyst. More preferably, it is loaded with Pd, Rh, or both Pd and Rh. From the viewpoint of the contact efficiency with exhaust gas, the three-way catalyst of the present invention is more preferably a coated ceramic honeycomb structure or metal honeycomb structure. The three-way catalyst of the present invention may contain, in addition to the ceria-zirconia-based complex oxide and precious metal catalyst, the conventional ceria-zirconia, ceria, zirconia, alumina, silica, zeolite, etc. These oxides may also be loaded with precious metals. However, the ceria-zirconia-based complex oxide is preferably contained in at least 25 mass % or more, more preferably 35 mass % or more, most preferably 50 mass % or more.

A three-way catalyst containing the ceria-zirconia-based complex oxide on which a precious metal catalyst of Pd is loaded is excellent in ability to remove HC, CO, and NOx. Among these, it is excellent in ability to remove CO and NOx. In particular, it is excellent in ability to remove NOx. Normally, a precious metal catalyst of Pd exhibits excellent properties as an oxidation catalyst of hydrocarbons HC and carbon monoxide CO, while a precious metal catalyst of Rh exhibits excellent properties as a nitrogen oxide NOx reduction catalyst. On the other hand, a precious metal catalyst of Pd according to the present invention is also excellent in properties as a NOx reduction catalyst. This is due to the synergistic effect of the large effect of the speed of oxygen-storage and -release of the ceria-zirconia-based complex oxide and the effect of Gd contained in the ceria-zirconia-based complex oxide.

A "three-way catalyst" is a catalyst which can simultaneously perform oxidation of CO and HC and reduction of nitrogen oxides (NOx) to purify exhaust gas. As an example of the configuration of a three-way catalyst, an oxide support which loads a precious metal (for example, Pt, Rh, Pd, Ir, Ru, etc.) may be mentioned. The oxide support may be a single type or a combination of two or more types. Further, oxides not loading a precious metal may also be included in the oxide support. Further, the oxide support may load two types or more of precious metals. The oxygen storage and release material of the present invention is used as the oxide support contained in the three-way catalyst. However, when 24 mass % or more of the oxides contained in the three-way catalyst is the oxygen storage and release material of the present invention, the effect of the present invention is obtained. The content of oxygen storage and release material of the present invention is more preferably contained in 43 mass % or more, more preferably 50 mass % or more of the oxides contained in the three-way catalyst. Further, in the three-way catalyst, the precious metal may be loaded on the oxygen storage and release material of the present invention for use. Otherwise, a mixture of another oxide by which the precious metal is loaded and the oxygen storage and release material of the present invention on which the precious metal is not loaded may be used to form the three-way catalyst.

As one embodiment, by virtue of coating the three-way catalyst containing the oxygen storage and release material on a honeycomb carrier made of refractory ceramic or metal to form a catalyst layer, the three-way catalyst may be made a honeycomb structure. It is possible to efficiently purify exhaust gas by making the three-way catalyst a honeycomb structure.

As one embodiment, there is provided a method of using a catalyst described below to treat automotive exhaust gas containing NOx, CO, and HC. The catalytic converter provided with a three-way catalyst produced in accordance with the present invention exhibits a more excellent catalyst performance (purification performance) compared with a conventional three-way catalyst. As another aspect of the present invention, there is provided a system treating automotive exhaust gas using a catalyst according to the present invention, which is connected to a conduit carrying exhaust gas passing through the system.

Here, the term "wash-coat" is well known in the art and refers to an adherent coating that is applied to a carrier material usually during production of a catalyst. The term "precious metal" include a PGM (platinum group metal and includes metals of Ru, Rh, Pd, Os, Ir, Pt, and Au. The term "precious metal" preferably refers to a metal selected from the group consisting of Ru, Rh, Pd, and Pt. In general, the term "precious metal" preferably refers to a metal selected from the group consisting of Rh, Pt, and Pd.

A complex oxide in general consists of a plurality of oxides formed of a single phase. However, it may also consist of a plurality of oxides formed in a plurality of phases more than a single phase.

Figure 1:
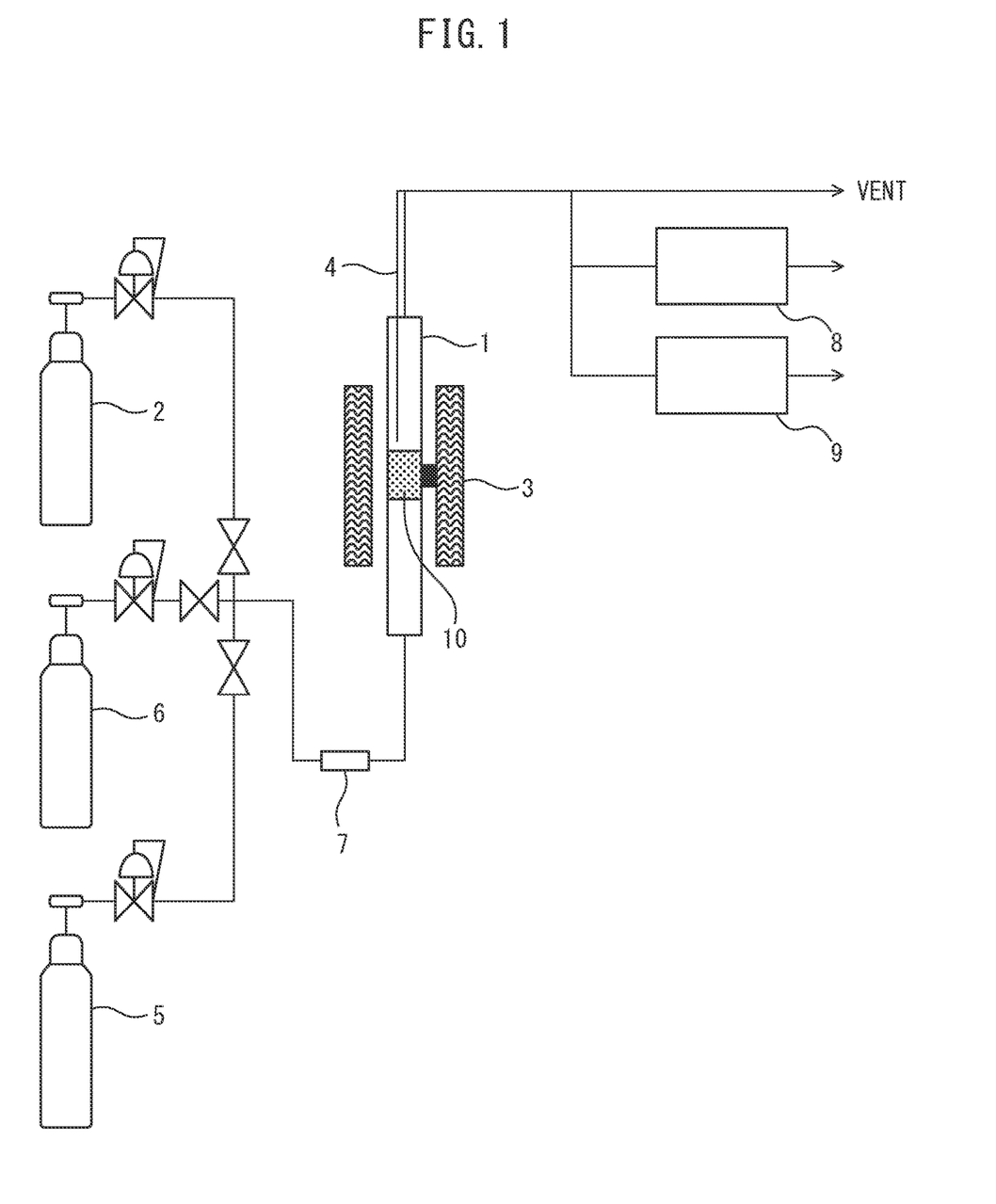
FIG. 1 is a schematic view of a device for measuring speed of OSC.

The speed of OSC measured in the present invention is measured as follows. As shown in FIG. 1 showing a schematic view of the speed of OSC measuring device for explanation, first, measurement is carried out in a state with nothing being filled inside the reaction tube 1 (blank test). That is, the reaction tube 1 is heated by an electric furnace 3 and raised in temperature to 400° C. in a flow of $O_2$ supplied from an $O_2$ tank 2 (3 mass % $O_2$, $N_2$ balance). The temperature inside of the reaction tube 1 is measured by a thermocouple 4. The inside of the reaction tube 1 is purged by $N_2$ supplied from an $N_2$ tank 5 and CO is run from a CO tank 6 (1.5 mass % CO, $N_2$ balance). The amounts of flow of the $O_2$, CO, and $N_2$ are measured by flow indicators 7. The $O_2$ and CO discharged from the reaction tube 1 are respectively measured by an $O_2$ meter 8 and CO meter 9. The time period at the time when the CO concentration becomes to be half of the circulated CO concentration ($t_{50(Blank)}$) is determined. Next, the measurement is carried out in a state packing a reaction layer 10 with ceria-zirconia-based complex oxide powder impregnated with and loading a Pd of 0.5 mass % in the reaction tube 1 (Sample measurement). The reaction tube 1 is raised to temperature to 400° C. in a flow of $O_2$. It is then purged by $N_2$ and run through by CO. The time period at the time when the CO concentration becomes to be half of the circulated CO concentration ($t_{50(Sample)}$) is determined, and the following formula is used to determine the speed of OSC "$\Delta t_{50}$".

Using the formula $\Delta t_{50}=t_{50(Sample)}-t_{50(Blank)}$, the speed of OSC "$\Delta t_{50}$" is calculated. A ceria-zirconia-based complex oxide with an $\Delta t_{50}$ of 20.0 seconds or more, that is, with an ion conductivity of $2\times10^{-5}$ S/cm or more at 400° C., is excellent in oxygen storage and release property, is fast in OSC speed, and can improve the performance of precious metals in removing harmful components.

Figure 2:
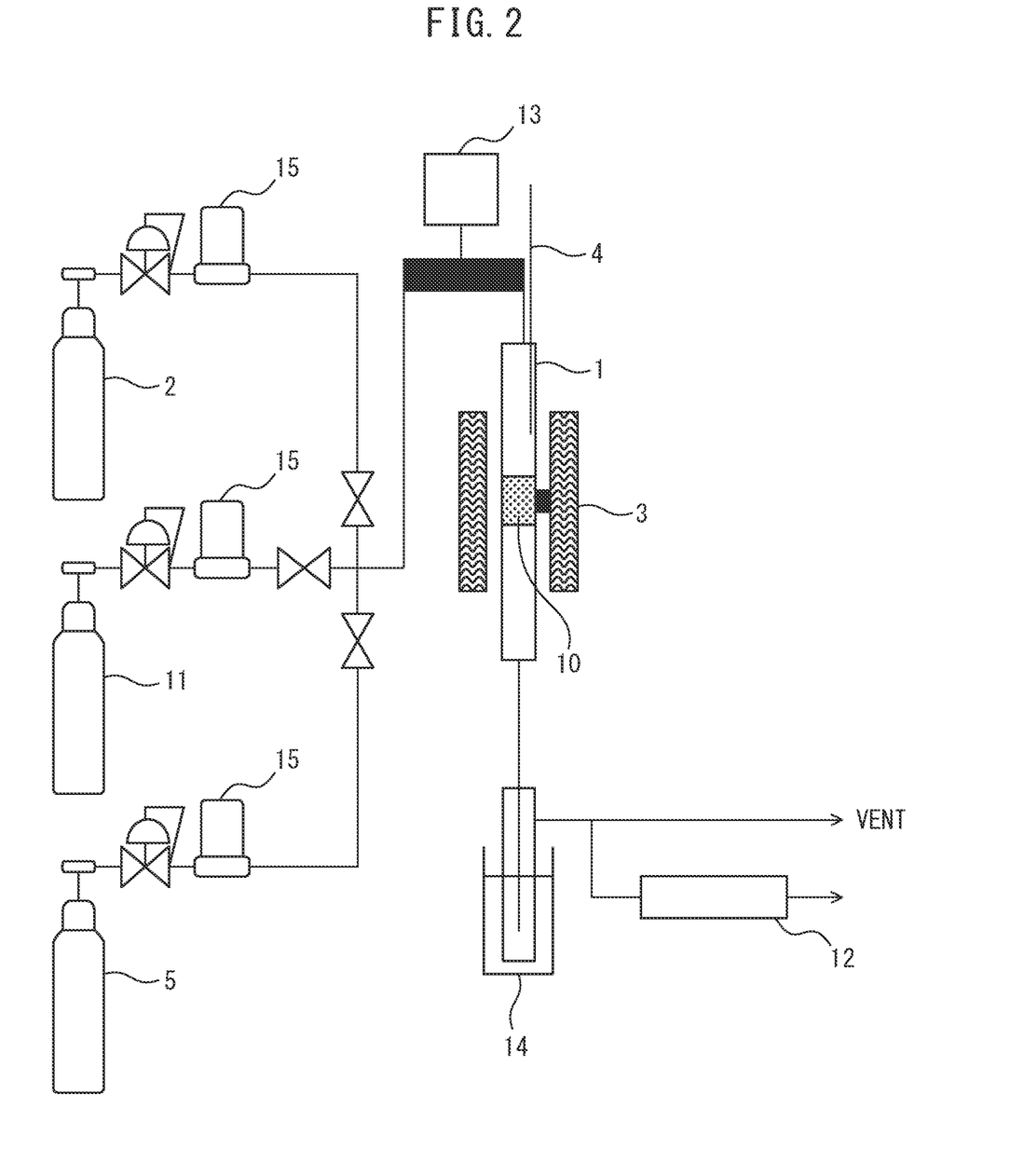
FIG. 2 is a schematic view of an HC oxidation activity test device.

The HC oxidation activity test measured in the present invention is carried out as follows: FIG. 2 showing a schematic view of an HC oxidation activity test is used for the explanation. First, the reaction tube 1 is packed with ceria-zirconia-based complex oxide powder impregnated with 0.5 mass % of Pd in a reaction layer 10. Next, the inside of the reaction tube 1 is purged by $N_2$ from the $N_2$ supplied tank 5, and $O_2$ and HC are run from the $O_2$ tank 2 (0.45 mass % $O_2$, $N_2$ balance) and an HC tank 11 (0.3 mass % HC ($C_3H_6$), $N_2$ balance). The amounts of flow of $N_2$ and $O_2$ were respectively measured by mass flow controllers 15 (MFC). The A/F is made to change by increments of $\lambda=\pm0.05$ with respect to the stoichiometric A/F ratio of $\lambda=1$ at intervals of 40 times/h. Separately from this step, $H_2O$ is introduced into the flow path by a syringe 13. The temperature of the electric furnace 3 is made to rise from 200° C. while measuring the $CO_2$ concentration $C_{CO2}$ at the outlet by virtue of a $CO_2$ meter 12. The temperature of the inside of the reaction tube 1 is measured by a thermocouple 4. The $H_2O$ in the exhaust gas is removed by the $H_2O$ trap 14 before introducing the gas to the $CO_2$ meter. The measurement is ended when the $CO_2$ concentration becomes to be constant after the start of measurement to obtain the CO concentration $C_{CO2}$ (saturation). The following formula is used to find the conversion rate (conversion/%).

The HC conversion rate is calculated by a formula of the HC conversion rate (%)=$C_{CO2}$(%)×100/[($C_{CO2}$(saturation) (%)]. From the relationship of the temperature and HC conversion rate, the higher the HC conversion rate at a low temperature, the better the HC oxidation activity and the more the purification performance of the catalyst can be improved.

Figure 3:
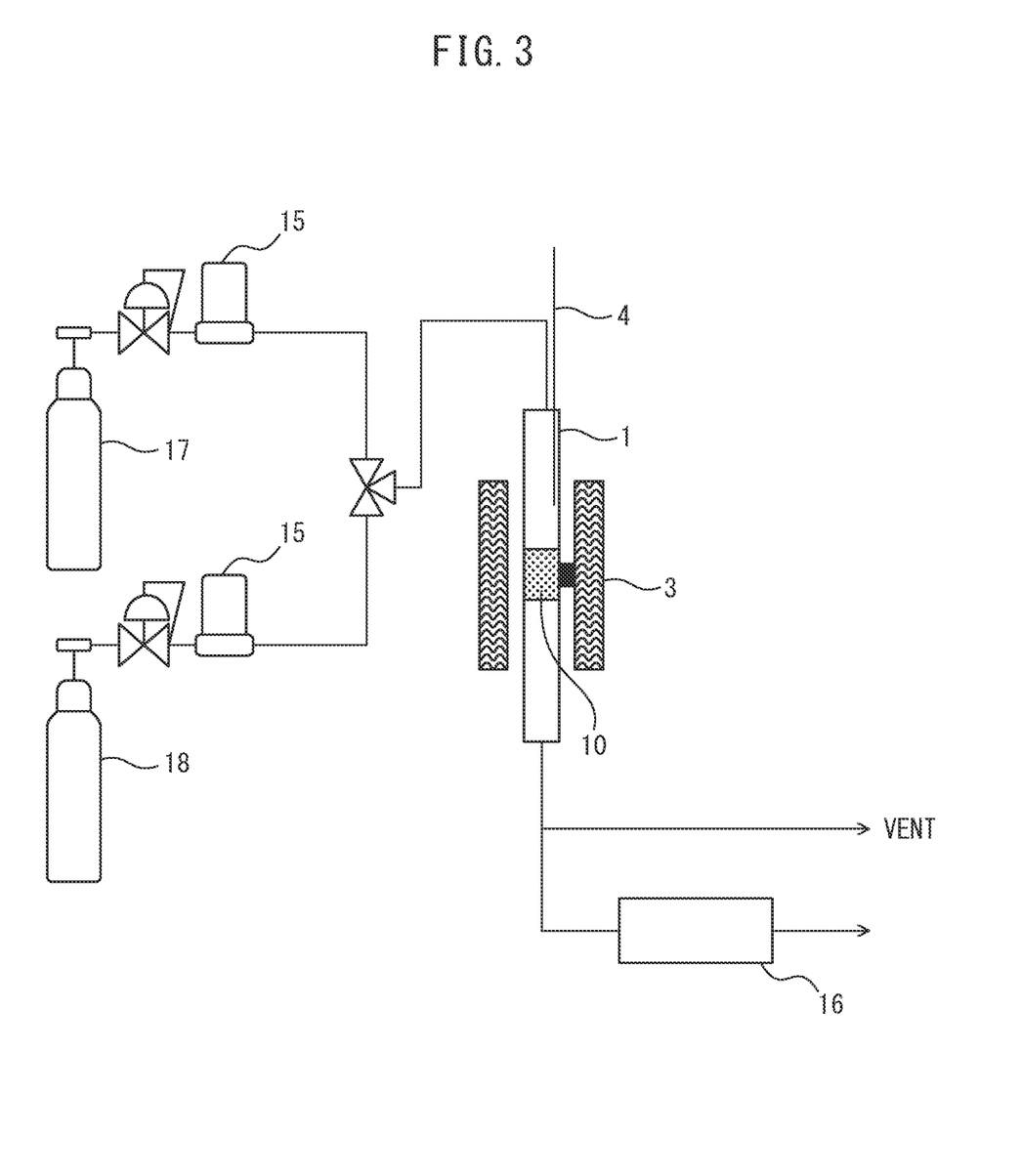
FIG. 3 is a schematic view of an NOx reduction activity test device.

The NOx reduction activity test of the present invention is conducted in the following way. FIG. 3 showing a schematic view of an NOx reduction activity test is used for explanation. First, a reaction tube 1 is packed with a ceria-zirconia-based complex oxide powder impregnated with 0.5 mass % of Pd in a reaction layer 10. Next, NOx is run from the rich gas tank 17 (NOx/air, $\lambda=0.95$) and lean gas tank 18 (NOx/air, $\lambda=1.05$). The amounts of flow from the tanks are respectively measured by mass flow controllers 15. The A/F is made to change by increments of $\lambda=\pm0.05$ with respect to the stoichiometric air-fuel ratio of $\lambda=1$ at intervals of 40 times/h. The temperature of the electric furnace 3 is raised from 200° C. while measuring the $N_2$ concentration $C_{N2}$ at the outlet is measured by virtue of an $N_2$ meter 16. The temperature of the inside of the reaction tube 1 is measured by a thermocouple 4. The $N_2$ concentration $C_{N2}$(saturation) when the $N_2$ concentration becomes to be constant is determined. The conversion rate (conversion/%) is found by the following formula:

The NOx conversion rate is calculated by the formula of NOx conversion rate (%)=$C_{N2}$(%)×100/[$C_{N2}$(saturation) (%)]. From the relationship of the temperature and NOx conversion rate, the higher the NOx conversion rate at a low temperature, the better the NOx reduction activity and the more improved the performance in purification of the catalyst.

EXAMPLES

Below, examples (invention examples) and comparative examples will be used to specifically explain the present invention, but the present invention is not limited to these. A person skilled in the art will be able to understand the present invention without deviating from the true gist and scope defined in the claims. All materials (raw materials) are commercially available products unless particularly noted otherwise and can be acquired from ordinary suppliers.

The ion conductivity is measured as explained below. The sample (ceria-zirconia-based complex oxide) was calcined at 1200° C. and crushed by a wet ball mill. As the binder, PVA was added in 1 mass % to 500 g of the sample and pressure of 1 ton/m² was applied to prepare pellets. After that, the sample was sintered at 1450° C. and the pellets were coated with silver paste. The pellets coated with the silver paste were measured by AC impedance by JIS R1661.

The speed of OSC was measured by the above-mentioned measurement method while the amount of OSC was measured in the following way. An alumina pan was filled with about 10 mg of the sample (ceria-zirconia-based complex oxide) and was set in a thermogravimetric analyzer. The sample was reduced under a flow of 5% $H_2$/Ar at 400° C. for 1 hour. After that, the sample was oxidized at 800° C. in a flow of 100% $O_2$ for 10 minutes. The change in weight before and after oxidation was calculated as the amount of OSC of the sample.

Example 1

An aqueous solution of a ratio of zirconium oxychloride and cerium chloride $ZrO_2:CeO_2=17.5:7$ and a $ZrO_2+CeO_2$ concentration of 40.8 g/L was prepared and ammonium peroxodisulfate was added to this solution to 15 g/L. The solution was heated up to the temperature of 98° C. with stirring it to thereby cause precipitation of a cerium-zirconium composite sulfate. The obtained solution was poured into 3.3% ammonia water to a pH of 8 or more. The obtained precipitate was filtered and washed by 2.5% ammonia water repeatedly five times to obtain a cerium-zirconium composite hydroxide cake.

Pure water was added to the obtained cerium-zirconium composite hydroxide cake to prepare a slurry of a $ZrO_2+CeO_2$ concentration of 97 g/L. Hydrochloric acid was added to render the pH of the slurry 6.5. A cerium chloride solution, yttrium chloride solution, chloride palladium solution, and gadolinium chloride solution were added to the obtained slurry to a composition of a mass ratio of $CeO_2:ZrO_2:Y_2O_3:Pr_6O_{11}:Gd_2O_3=45:45:2.5:5:2.5$ to obtain a mixed solution of 154 g/L. Ammonia water was added to the obtained mixed solution to render the pH 6.5, then the pH was held while the solution was stirred for 5 minutes. Next, 25% ammonia water was added to render the pH 8.5 or more. The solution was held for 30 minutes, then filtered. The solution was repeatedly filtered and washed using 2.3% ammonia water three times to obtain a composite hydroxide cake. The obtained complex hydroxide cake was dried at 120° C. to a powder. This was packed into a crucible and fired in an electric furnace at 700° C. for 3 hours to obtain a ceria-zirconia-based complex oxide powder.

The obtained powder was measured for ion conductivity by way of the above-mentioned method, whereupon it was $4.35 \times 10^{-5}$ S/cm.

Further, the thus obtained powder was impregnated with Pd so as to load Pd on it in a ratio of 0.5 mass %, and the powder impregnated with Pd was measured for speed of OSC "$\Delta t_{50}$" and amount of OSC. The speed of OSC "$\Delta t_{50}$" was 20.0 seconds and the amount of OSC was 519 μmol-$O_2$/g.

Example 2

As shown in Table 2, except for making the composition of formulation $CeO_2:ZrO_2:Y_2O_3:Pr_6O_{11}:Gd_2O_3=45:45:5:2.5:2.5$, the same procedure was followed as in Example 1 to obtain a ceria-zirconia-based complex oxide powder.

The obtained powder was measured in the same way as Example 1 for ion conductivity, speed of OSC, and amount of OSC whereupon they were respectively $4.79 \times 10^{-5}$ S/cm, an $\Delta t_{50}$ of 20.0 seconds, and an amount of OSC of 480 μmol-$O_2$/g.

Example 3

As shown in Table 2, except for making the composition $CeO_2:ZrO_2:Y_2O_3:Gd_2O_3=45:45:5:5$, the same procedure was followed as in Example 1 to obtain a ceria-zirconia-based complex oxide powder.

The obtained powder was measured in the same way as Example 1 for ion conductivity whereupon it was $4.3 \times 10^{-5}$ S/cm.

Example 4

As shown in Table 2, except for making the composition $CeO_2:ZrO_2:Gd_2O_3=45:45:10$, the same procedure was followed as in Example 1 to obtain a ceria-zirconia-based complex oxide powder.

The obtained powder was measured for ion conductivity and SSA (specific surface area) after 1100° C. durability, whereupon they were respectively $4.0 \times 10^{-5}$ S/cm and 16 m²/g.

Example 5

As shown in Table 2, except for making the composition $CeO_2:ZrO_2:La_2O_3:Pr_6O_{11}:Gd_2O_3=45:40:5:5:5$, the same procedure was followed as in Example 1 to obtain a ceria-zirconia-based complex oxide powder.

The obtained powder was measured for speed of OSC, amount of OSC, and SSA after 1100° C. durability whereupon they were respectively a $\Delta t_{50}$ of 21.0 seconds, an amount of OSC of 507 μmol-$O_2$/g, and 30 m²/g.

Example 6

As shown in Table 2, except for making the composition $CeO_2:ZrO_2:CaO:Gd_2O_3=45:45:5:5$, the same procedure was followed as in Example 1 to obtain a ceria-zirconia-based complex oxide powder.

The obtained powder was measured in the same way as Example 1 for ion conductivity, speed of OSC, and amount of OSC whereupon they were respectively $2.2 \times 10^{-5}$ (S/cm), an $\Delta t_{50}$ of 21.0 seconds, and an amount of OSC of 420 μmol-$O_2$/g.

Comparative Example 1

As shown in Table 2, except for making the composition $CeO_2:ZrO_2:Y_2O_3:Pr_6O_{11}=45:47.5:2.5:5$, the same procedure was followed as in Example 1 to obtain a ceria-zirconia-based complex oxide powder.

The obtained powder was measured in the same way as Example 1 for ion conductivity, speed of OSC, amount of OSC, and SSA after 1100° C. durability whereupon they were respectively $5.42 \times 10^{-5}$ (S/cm), 24.0 seconds, 474 μmol-$O_2$/g, and 21 (m²/g).

Comparative Example 2

As shown in Table 2, except for making the composition $CeO_2:ZrO_2=45:55$, the same procedure was followed as in Example 1 to obtain a ceria-zirconia-based complex oxide powder.

The obtained powder was measured for ion conductivity, speed of OSC speed, amount of OSC, and SSA after 1100° C. durability in the same way as Example 1 whereupon they were respectively $1.8 \times 10^{-5}$ (S/cm), 14.9 seconds, 256 µmol-$O_2$/g, and 15 ($m^2$/g).

oxide obtained in Comparative Example 1 reach 50% were 365° C. and 360° C., respectively. The HC oxidation activity and NOx reduction activity, that is, the purification performances of harmful components, were inferior to those of the examples.

TABLE 2

| | No. | Composition | Third Component (substituted metal-ion elements) | Ce/ (Ce + Zr) | Ion conductivity $\alpha$(S·$cm^{-1}$) | Speed of OSC $\Delta t_{50}$ (sec) | Amount of OSC (µmol-$O_2$/g) | SSA ($m^2$/g) |
|---|---|---|---|---|---|---|---|---|
| Ex. | 1 | $Ce_{0.37}Zr_{0.52}Y_{0.06}Pr_{0.02}Gd_{0.02}O_{1.96}$ | Y, Pr, Gd | 0.42 | $4.35 \times 10^{-5}$ | 20.0 | 519 | — |
| | 2 | $Ce_{0.38}Zr_{0.53}Y_{0.03}Pr_{0.04}Gd_{0.02}O_{1.97}$ | Y, Pr, Gd | 0.42 | $4.79 \times 10^{-5}$ | 20.0 | 480 | — |
| | 3 | $Ce_{0.38}Zr_{0.54}Y_{0.06}Gd_{0.02}O_{1.97}$ | Y, Gd | 0.42 | $4.3 \times 10^{-5}$ | — | — | — |
| | 4 | $Ce_{0.50}Zr_{0.43}Gd_{0.07}O_{1.98}$ | Gd | 0.54 | $4.0 \times 10^{-5}$ | — | — | 16 |
| | 5 | $Ce_{0.2}Zr_{0.6}La_{0.05}Pr_{0.1}Gd_{0.05}O_{1.97}$ | La, Pr, Gd | 0.25 | — | 20.0 | 300 | 36 |
| | 6 | $Ce_{0.35}Zr_{0.55}Ca_{0.02}Gd_{0.08}O_{1.97}$ | Ca, Gd | 0.41 | $2.2 \times 10^{-5}$ | 21.0 | 420 | — |
| Comp. ex. | 1 | $Ce_{0.37}Zr_{0.55}Y_{0.03}Pr_{0.04}O_{1.97}$ | Y, Pr | 0.40 | $5.42 \times 10^{-5}$ | 24.0 | 474 | 21 |
| | 2 | $Ce_{0.37}Zr_{0.63}O_2$ | Non | 0.38 | $1.8 \times 10^{-5}$ | 14.9 | 256 | 15 |

From Table 2, when comparing Example 4 with Comparative Example 2, it is clear that addition of substituted metal-ion element of Gd improves the ion conductivity. That is, by virtue of further adding (substituting) Gd to CZ having its high ion-conductivity, the action and effect of the present invention are exhibited, and the ion conductivity can be further improved by the addition of substituted metal-ion element of Gd.

From Table 2, when comparing Example 4 and Example 5, it is clear that the SSA after aging at 1100° C. (durability test) is improved by virtue of the addition of substituted metal-ion element of La or Pr.

From Table 2, when comparing Example 5 or Example 6 with Comparative Example 2, it is clear that both the speed of OSC and amount of OSC are improved by virtue of the addition of substituted metal-ion element of Ca, La or Pr.

Figure 4:
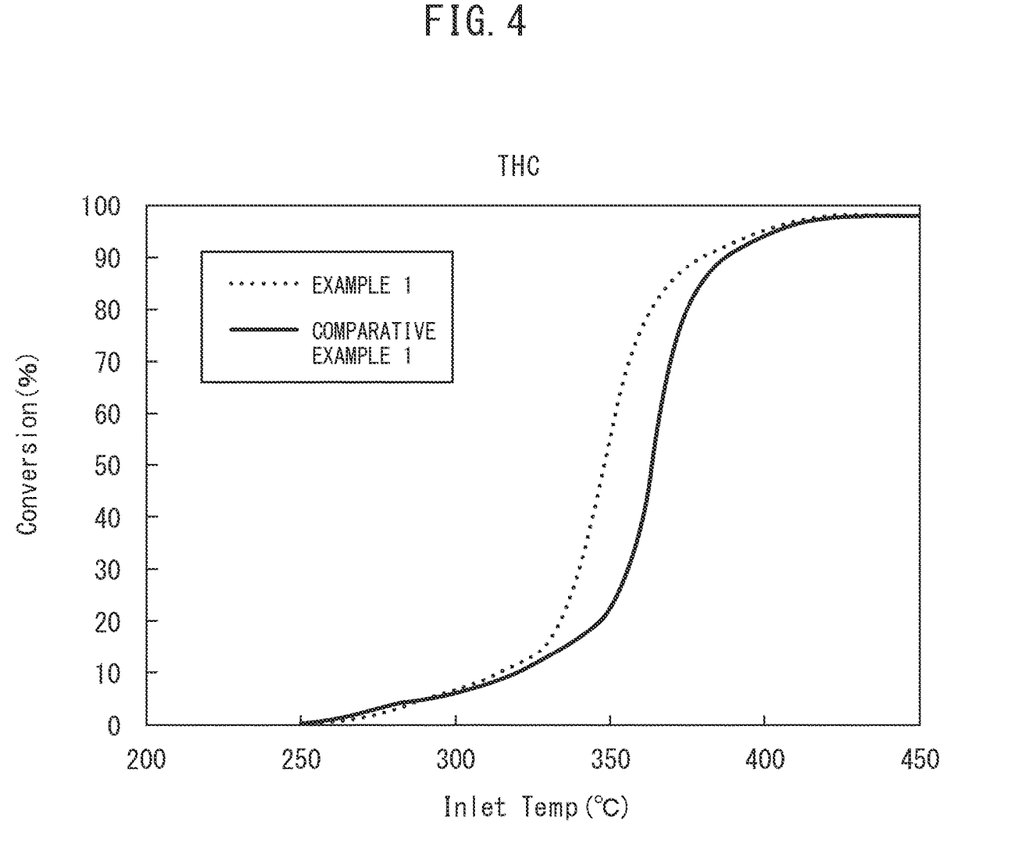
FIG. 4 is a view showing results of an HC oxidation activity test.

FIG. 4 shows the results of measurement in an HC oxidation activity test for Example 1 and Comparative Example. The temperatures at which the THC conversion rates reach 50% are respectively 347° C. and 365° C. As compared with Comparative Example 1, Example 1 can oxidize the HC at a lower temperature, so it is clear that the catalyst activity is higher.

Figure 5:
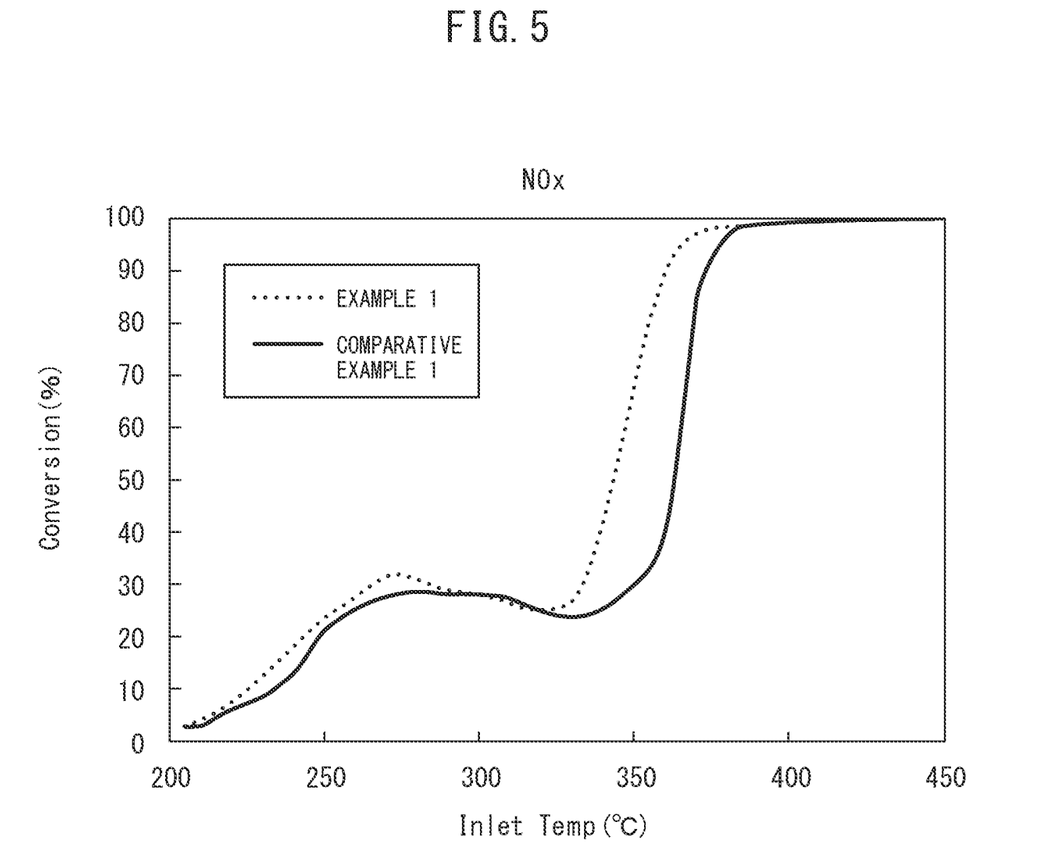
FIG. 5 is a view showing the results of an NOx reduction activity test.

FIG. 5 shows the results of measurement in a NOx reduction activity test for Example 1 and Comparative Example 1. The temperatures at which the NOx conversion rates reach 50% are 342° C. and 360° C., respectively. As compared with the Comparative Example, Example 1 can reduce the NOx at a lower temperature, so it is clear that the catalyst activity is higher.

From Table 2, the ceria-zirconia-based complex oxides obtained in Examples 1 and 2 and Comparative Example 1 were oxygen storage and release materials containing metal ions having a valence of less than 4 and having ion conductivities of $1 \times 10^{-5}$ S/cm or more at 400° C., speeds of OSC of 20.0 seconds, and amounts of OSC of 300 µmol-$O_2$/g.

From FIG. 4 and FIG. 5, the ceria-zirconia-based complex oxide obtained in Example 1 had temperatures where the HC and NOx conversion rates reached 50% of 347° C. and 342° C., respectively. Excellent HC oxidation activity and NOx reduction activity were shown.

On the other hand, the temperatures where the HC and NOx conversion rates of the ceria-zirconia-based complex Example 7

A three-way catalyst consisting of a single layer was prepared based on the present invention. The catalyst layer (wash-coated layer) was formed into a wash-coat comprising the Gd-added (Gd-substituting) ceria-zirconia-based complex oxide of Example 1, La-stabilized alumina and Ba promoter. Pd is loaded on the catalyst layer. The amount of wash-coated layer on the ceramic honeycomb is about 1.7 g/$inch^3$ (0.104 g/$cm^3$) and the amount of Pd loaded on the wash-coated layer is 45 g/$ft^3$ (1.27 g/$m^3$). In the oxide contained in catalyst layer of the honeycomb structure, the ceria-zirconia-based complex oxide of Example 1 is included in 45 mass %. The three-way catalyst was treated by way of an engine bench durability (aging) test wherein the fuel cut durability cycles at a peak temperature of 1000° C. was carried out for 100 hours. Further, a honeycomb catalyst was used to run a FTP mode running test (based on the regulation of California state, California Unified Cycle) using a 2.5 L engine commercially available vehicle.

Comparative Example 3

For comparison, an FTP mode running test was also conducted using a honeycomb catalyst consisting of a single layer prepared in the same way using a conventional ceria-zirconia-based complex oxide not containing Gd (currently used). The three-way catalyst was prepared by forming a ceria-zirconia-based complex oxide not containing Gd, La-stabilized alumina, and Ba facilitator into a wash-coat. Pd is loaded on the three-way catalyst. The amount of the wash-coated layer on the ceramic honeycomb is about 1.7 g/$inch^3$ (0.104 g/$cm^3$). The amount of Pd loaded on the wash-coat layer is 45 g/$ft^3$ (1.27 g/$m^3$).

Figure 6A:
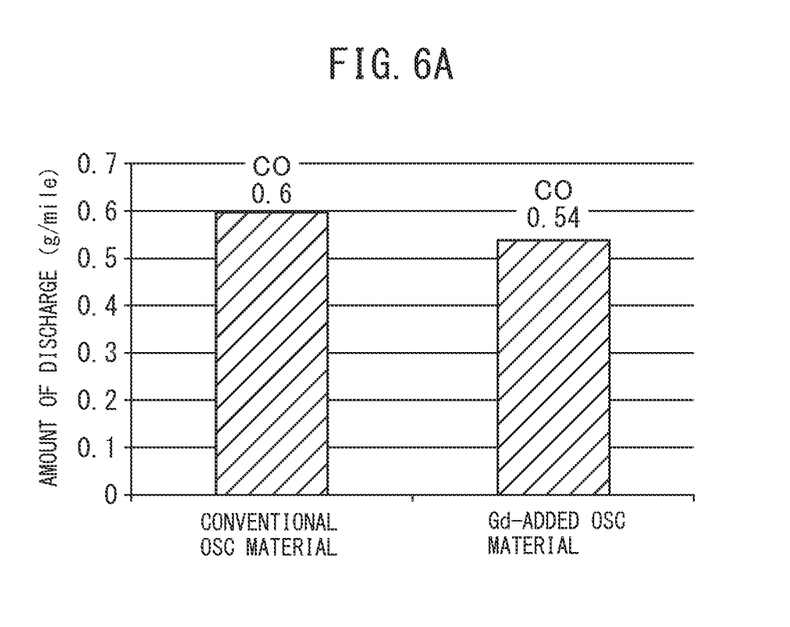
Figure 6B:
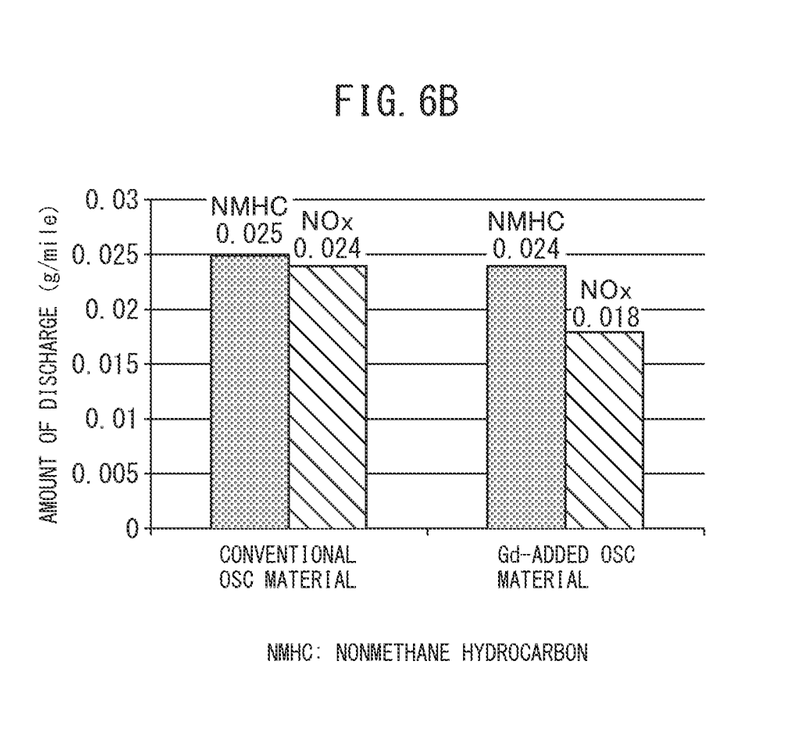
FIG. 6B is a view showing the results of evaluation of NMHC (nonmethane hydrocarbon) and NOx.

The three-way catalyst was treated by way of an engine bench durability (aging) test wherein the fuel cut durability cycles at a peak temperature of 1000° C. was carried out for 100 hours. Driving test with a FTP mode was conducted on the above-mentioned honeycomb catalyst using a commercial vehicle with a 2.5 L engine. The results are shown in FIGS. 6A and 6B. FIG. 6A shows the results of evaluation by the difference in amounts of emission of CO, while FIG. 6B shows the results of evaluation by the difference in amounts of emission of NMHC (nonmethane hydrocarbon) and NOx. As will be understood from FIGS. 6A and 6B, a three-way catalyst using a ceria-zirconia-based complex oxide of the present invention (Example 7) enables reduction of the amounts of emission of the HC (in FIG. 6B, NMHC (nonmethane hydrocarbon)), CO, and NOx and in particular enables great reduction of the amounts of emission of CO and NOx. Similarly, when the ceria-zirconia-based complex oxide of Examples No. 2 to 6 are used, the effect of reducing the amount of NOx emission is also recognized. On the other hand, in Comparative Examples 1 to 2, a sufficient effect of reduction of emission of NOx is not recognized.

As explained above, according to the present invention, it was confirmed that a ceria-zirconia-based complex oxide with a large speed of OSC and further a large amount of OSC is obtained. In particular, an excellent effect in NOx purification ability could be confirmed.

INDUSTRIAL APPLICABILITY

When using a material of the present invention having a high HC oxidation and NOx reduction activity as the catalytic promoter of an automobile exhaust gas purification catalyst, it is possible to assist the purification of exhaust gas which changes with each instant in accordance with the driving state and improve the performance of catalytic precious metals in removing harmful components more than even the past.

REFERENCE SIGNS LIST 1 reaction tube
2 $O_2$ tank
3 electric furnace
4 thermocouple
5 $N_2$ tank
6 CO tank
7 flow indicator
8 $O_2$ meter
9 CO meter
10 reaction layer
11 $C_3H_6$ tank
12 $CO_2$ meter
13 $H_2O$ syringe
14 $H_2O$ trap
15 mass flow controller
16 $N_2$ meter
17 rich gas tank
18 lean gas tank

The invention claimed is:

1. An oxygen storage and release material comprising a ceria-zirconia-based complex oxide,
having an ion conductivity of $2\times10^{-5}$ S/cm or more at 400° C.
wherein ions of Y and Pr are partially substituted in said ceria-zirconia-based complex oxide,
wherein Gd ions are substituted for the cerium ions or zirconium ions in said ceria-zirconia-based complex oxide in a range from 0.2 mol % or more to less than 40 mol % with respect to a total cations of the ceria-zirconia-based complex oxide,
wherein a molar ratio of the cerium and zirconium in said ceria-zirconia-based complex oxide is 0.3 or more and 0.5 or less in terms of a ratio expressed by cerium/(cerium+zirconium) and,
wherein an amount of oxygen storage and release is 480 $\mu mol$-$O_2$/g or more.

2. The oxygen storage and release material according to claim 1, wherein said ceria-zirconia-based complex oxide includes at least one of an alkaline-earth metal ions and rare-earth metal ions having an ion radius larger than $Gd^{3+}$ ions.

3. The oxygen storage and release material according to claim 2, wherein a speed of oxygen storage and release $\Delta t_{50}$ is 20.0 seconds or more.

4. The oxygen storage and release material according to claim 1, wherein a speed of oxygen storage and release $\Delta t_{50}$ is 20.0 seconds or more.

5. A catalyst including an oxygen storage and release material, wherein the catalyst includes the oxygen storage and release material according to claim 1.

6. The catalyst according to claim 5, wherein the catalyst has a honeycomb structure of a ceramic honeycomb or metal honeycomb coated with a catalyst layer.

7. The catalyst according to claim 5, wherein the catalyst further includes an oxygen storage and release material including at least one compound selected from the group consisting of cerium oxide, zirconium oxide, and a ceria-zirconia-based complex oxide.

8. The catalyst according to claim 5, wherein the catalyst further includes an oxygen storage and release material of a ceria-zirconia-based complex oxide.

9. The catalyst according to claim 5, wherein the catalyst includes a precious metal of a platinum group.

10. The catalyst according to claim 9, wherein the catalyst includes at least one precious metal selected from the group consisting of platinum, palladium, and rhodium.

11. The catalyst according to claim 5, wherein the catalyst further includes an inorganic oxide.

12. The catalyst according to claim 11, wherein said inorganic oxide is at least one compound selected from the group consisting of alumina, lanthanum-stabilized alumina, alkaline-earth-stabilized alumina, silica, aluminosilicates, magnesia/alumina complex oxide, titania, niobium oxide, tantalum oxide, neodymium oxide, yttrium oxide, and lanthanoids oxide.

13. An exhaust gas purification system for treating combustion exhaust gas including the catalyst according to claim 5.

14. A method of treating exhaust gas from an internal combustion engine bringing the catalyst according to claim 5 into contact with exhaust gas.

15. The oxygen storage and release material according to claim 1, wherein the oxygen storage and release material contains Nd of an amount of 0.1 to 20 mol % with respect to a total cations of the ceria-zirconia-based complex oxide.

16. The oxygen storage and release material according to claim 1, wherein the ceria-zirconia-based complex oxide contains $Gd_2O_3$ in 0.1 mol % or more and less than 20 mol %.

* * * * *